Figure 1:
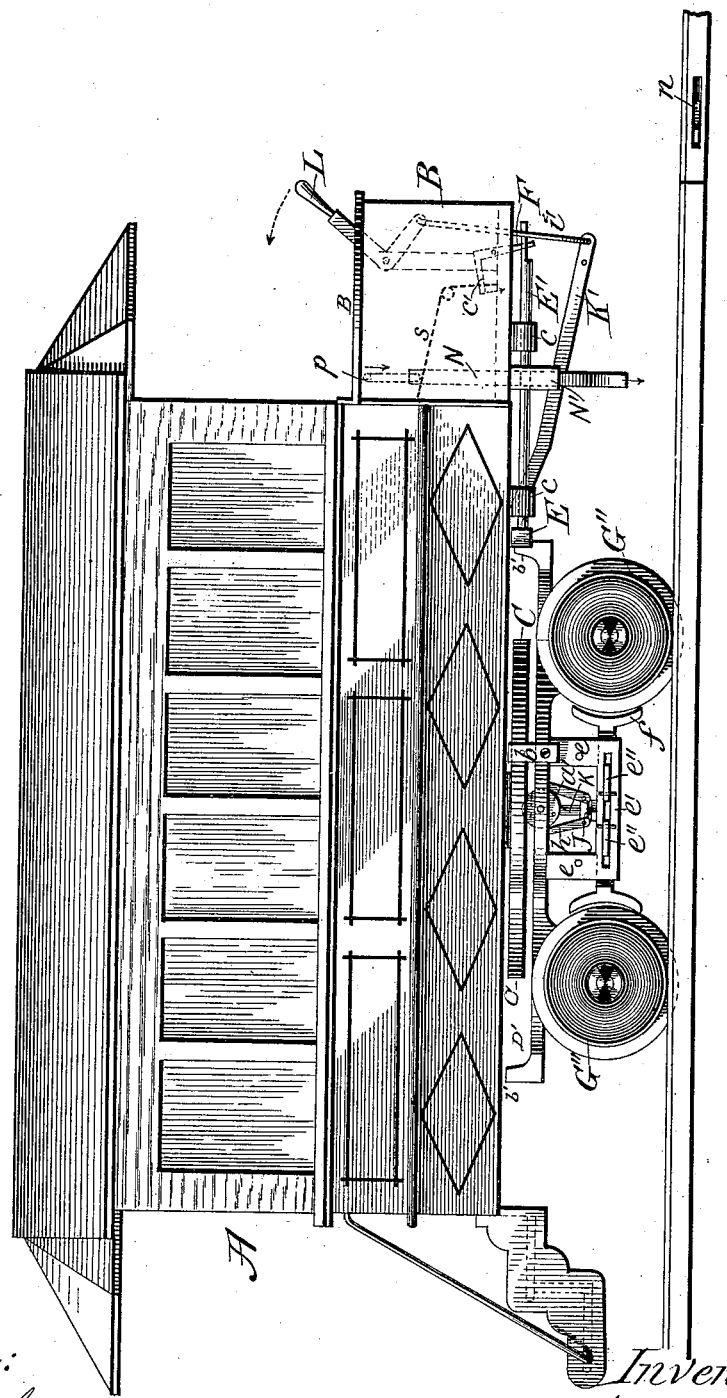

(No Model.)  
3 Sheets—Sheet 1.

M. A. CUTTER.
STREET CAR.

No. 333,450. Patented Dec. 29, 1885.

Attest:  
F. H. Schott  
M. Tinryck

Inventor:  
M. A. Cutter (No Model.) 3 Sheets—Sheet 2.

M. A. CUTTER.
STREET CAR.

No. 333,450. Patented Dec. 29, 1885.

Attest:
F. H. Schott
M. Tenryck

Inventor:
M. A. Cutter (No Model.)  3 Sheets—Sheet 3.

M. A. CUTTER.
STREET CAR.

No. 333,450. Patented Dec. 29, 1885.

Attest:
F. H. Schott
M. Tenryck

Inventor:
M. A. Cutter

UNITED STATES PATENT OFFICE.

MARTIN A. CUTTER, OF GALVESTON, TEXAS.

STREET-CAR.

SPECIFICATION forming part of Letters Patent No. 333,450, dated December 29, 1885.

Application filed November 10, 1885. Serial No. 182,329. (No model.)

*To all whom it may concern:*

Be it known that I, MARTIN A. CUTTER, a citizen of the United States, residing at Galveston, in the county of Galveston and State of Texas, have invented certain new and useful Improvements in Street-Cars, of which the following is a specification, reference being had therein to the accompanying drawings.

This invention relates to an improvement in that class of street-cars in which the car is turned upon the truck, instead of turning both truck and car upon a turn-table forming a portion of the track. In this class of cars much difficulty has been experienced in obtaining a proper action of the brakes, owing to the fact that the central point or king-bolt upon which the car turned was also the point where the brake-operating mechanism must be connected in order to have a perfect-working brake;
but as the king-bolt and brake-operating devices could not occupy the same space one of them—the brake-connections—had to give place to the other, which must in the common construction occupy the central or turning point. The brake-connections, therefore, had to be made at one side of the king-bolt, thus throwing the brake mechanism out of equilibrium, causing a greater pressure on some wheels of the truck than on others. Another difficulty encountered by this class of cars and all other one-horse cars carrying only a driver has been in operating the switches. When a conductor is employed on a car, it becomes a part of his duty to jump off, run ahead, and open switches; but where a driver alone runs a car he cannot leave it, and is therefore obliged to carry a long bar having a hook or part projecting at right angles at one end, which he inserts between the rail and point to throw the latter over. This becomes an uncertain and even dangerous business, as in his anxiety to catch the switch without stopping he gives his whole attention to that, thus rendering his car liable to collide with passing teams or to run over pedestrians who may be crossing the track.

To avoid these and other difficulties which have been heretofore encountered in the operation of this class of street-cars is the object of my invention, which object I accomplish by constructing the car practically without a king-bolt, substituting therefor a circular track attached to the bottom of the car and running upon friction-wheels carried by the truck-frame. This circular track having a diameter nearly equal to the entire width of the car gives the latter a firm broad base to rest upon, thus avoiding the uncomfortable oscillations common in those cars mounted upon the ordinary wear-irons and king-bolt, while the space within the circular track affords ample room for placing the brake mechanism properly, so that its action shall be equable, giving an equal pressure of the brake-shoes upon all the wheels of the truck, the truck-frame being of metal, its upper part corresponding in outline with the circular track, and provided with a series of wheels set at right angles to its radius, so that the circular track travels upon them with the least possible friction. This frame also carries the pedestals which receive the axle-boxes, the downwardly-projecting arms of the pedestals being of such length as to allow plenty of room between them above the axle-boxes for the play of the springs which carry the truck-frame and car-body. Diametrically opposite each other, at the front and rear of the frame, are projections, with which the catch or holding device operated by the driver engages when the car is not being turned. This catch is operated by the driver through the agency of a foot-lever, so that his attention is not diverted from his horse or what is passing around him when he is turning the car. The braking-lever is also brought to a point where it may readily be grasped by the driver without changing his position; and the same may be said of the switch-shifting devices, which are placed at each side of the platform, where he may control the action of either, as the course of the car is to be diverted to the right or left.

Figure 2:
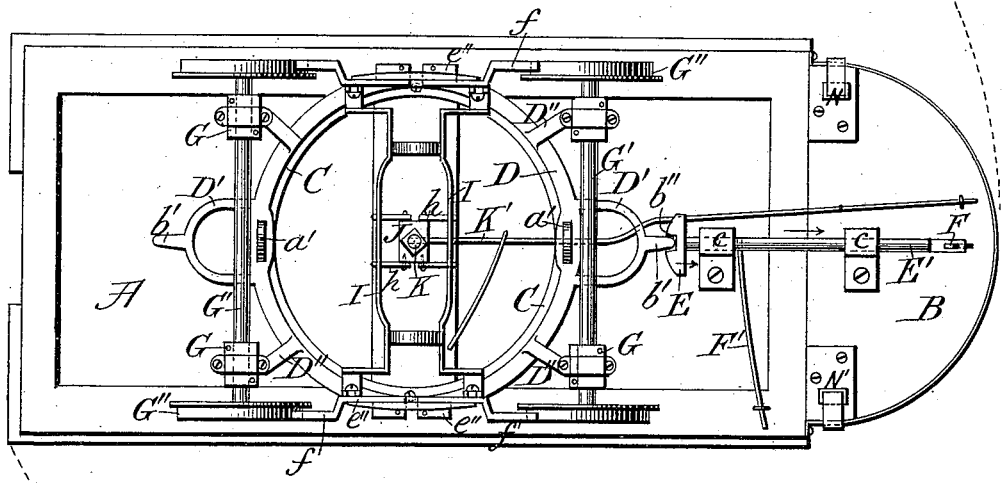
Figure 3:
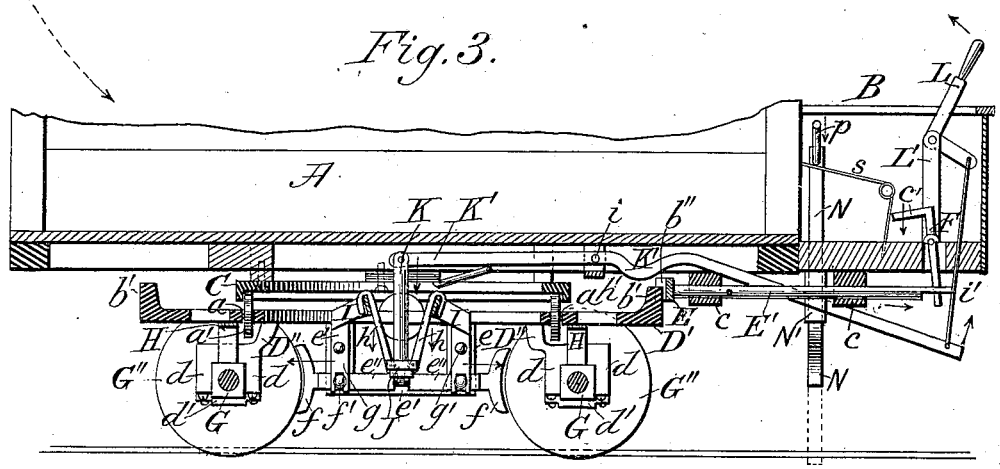
Figure 4:
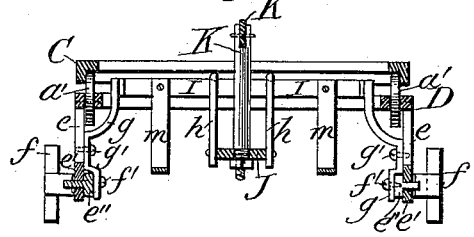
Figure 5:
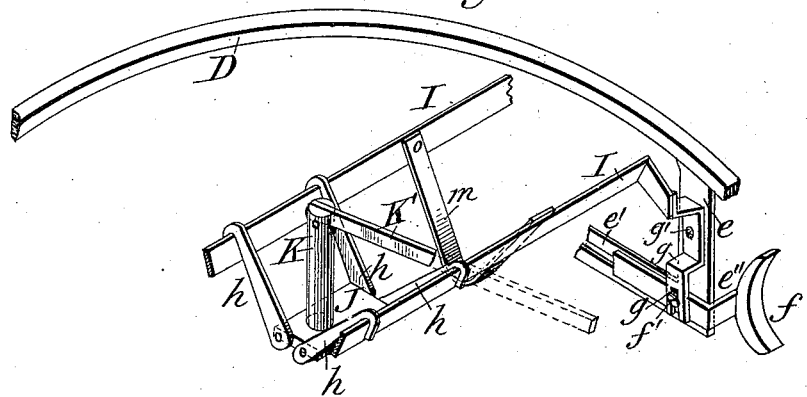
Figure 6:
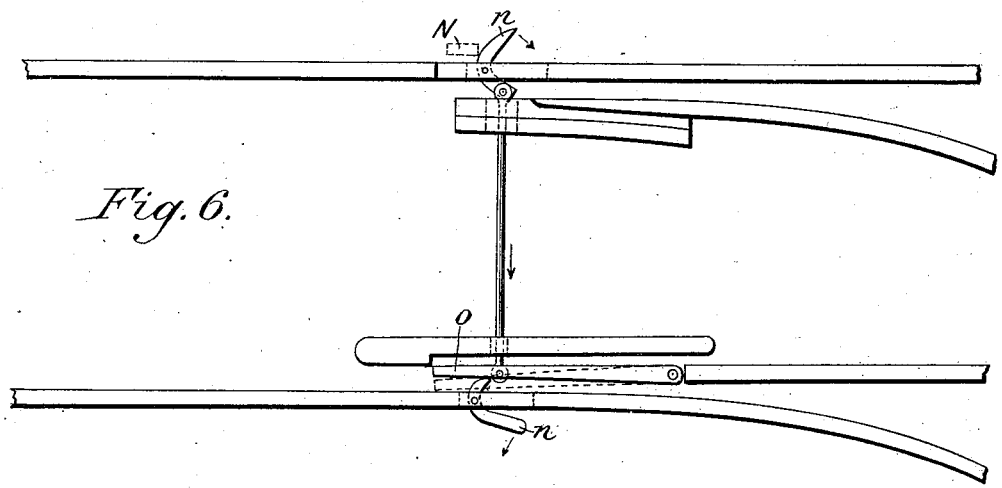
Figure 7:
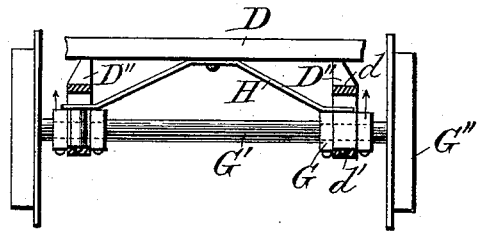

In the accompanying drawings, which form a part of this specification, Figure 1 is a side view of the car complete, showing the general arrangement of the parts. Fig. 2 is a bottom plan view. Fig. 3 is a longitudinal section. Fig. 4 is a transverse section through the truck-frame at mid-length. Fig. 5 is an enlarged perspective view of a portion of the truck-frame and brake mechanism. Fig. 6 is a plan of a section of track provided with a switch and the devices which engage the shifting apparatus connected to the car. Fig. 7 is a transverse section through the car-truck and pedestals, showing the manner in which the springs are applied.

In Fig. 1, A represents the car-body, which may be of any ordinary construction and provided with an inclosed platform, B, at one end and entrance-door and steps at the other. This car-body A is mounted upon an annular flanged plate, C, which is secured to the cross-pieces and sills of the body by suitable bolts. Beneath this plate C, and supporting it and the car-body, is the car-truck, the frame D of which is also of annular form and provided with a series of mortises, $a\,a$, four or more in number. These mortises are tangential to the radii of the frame, and each one receives a wheel, $a'$, the journals of which are placed radially and supported by the frame. The upper parts of these wheels project above the frame D and carry the flanged plate C, the flange of which projects downward outside the wheels and prevents its displacement when the car is revolved.

It will be evident that, if desired, the plate C may have an inner as well as an outer flange, the wheels $a'$ running in the groove between them.

A further means for preventing the displacement of the car consists of the clamps $b\,b$, secured to the truck-frame, their upper ends being turned over the outer edge of the plate C in such a manner that while they prevent the displacement of the plate they form no obstacle to its free revolution.

The annular portion of the truck-frame D is provided with two projections, D′, placed diametrically opposite each other and projecting beyond the line of the wheels at each end of the truck. These projections D′ terminate at their outer ends in the upwardly-turned catch-pins $b'\,b'$, which pins are received in a notch, $b''$, in the catch-block E. This catch-block has its faces at each side of the notch rounded or slanted, so that when it comes in contact with either of the catch-pins it will ride on the same until the pin enters the notch, thus retaining the car-body to which the catch-block is attached firmly in position. To the opposite side of the catch-block from the notch $b''$ is attached the rod E′, carried and freely sliding in brackets $c\,c$, which are secured to the bottom of the car. A hole through the front end of this rod E′ receives the lower end of the lever F, pivoted to the car-floor within the inclosed platform B, the upper end of said lever being bent to the rear and forming a stop-plate, $c'$, upon which the foot of the driver presses when it is desired to release the catch-block from its engagement with either of the catch-pins $b'$ for the purpose of turning the car.

In order to keep the catch-block in engagement with one of the catch-pins except when released, as before stated, by the driver, a spring, F′, is secured at one end to one of the car-sills, its opposite end passing through an orifice in the bar E′, or otherwise suitably connected with it.

Preferably cast integral with and projecting radially from the annular portion of the truck-frame D at four points are the arms D″, each of which carries the two downwardly-projecting arms $d\,d$, forming the jaws of a pedestal, within which arms and having free vertical movement therein are the journal-boxes G, a pair of said boxes carrying one of the axles G′, to the ends of which are secured the car-wheels G″. A keeper, $d'$, connects the lower ends of each pair of vertical arms or jaws $d\,d$, and prevents the axle-boxes from falling out when the trucks are raised, and also strengthens and preserves the parallelism of the jaws. It will be observed that the axle-boxes do not fill the space between the jaws of the pedestal in a vertical direction, but that sufficient movement is allowed to give free play to the springs bearing upon the top of the axle-box and against the under side of the truck-frame. These springs may consist of the ordinary coiled steel or rubber varieties in common use upon street-cars, placed between the top of the axle-box and that portion of the truck-frame over it; but I prefer the half-elliptic steel springs H, arranged as shown in the accompanying drawings, the middle of the spring being secured to the under side of the truck-frame, and its two ends resting upon the axle-boxes at each end of the same axle, as clearly illustrated by Fig. 7 of the drawings. This arrangement of springs, coupled with a slight end-play allowed the axles in their boxes, gives perfect freedom to the running-gear of the car, absorbing the jolts from switches or other elements of disturbance that may be encountered in its progress. The half-elliptic springs also act as equalizers and properly distribute the weight upon the four bearings of the axles.

The brake mechanism of this car, which is a very important item in all street-cars, is constructed and operated as follows: At each side of the truck-frame D are two downwardly-projecting arms, $e\,e$, connected at the bottom by a slotted horizontal bar, $e'$. Sliding in these slots are the arms $e''$ of the brake-heads $f$, which are firmly attached to the arms $e''$, or cast integral therewith, a projecting tongue upon one side of the arm passing through the slot in the bar $e'$, and acting as a guide to prevent the movement of the arms $e''$ and their attached brake-heads in anything but a horizontal line parallel to the longitudinal axis of the car.

It will be evident that instead of the slots a dovetail groove may be formed on either the outside or inside of the bar $e'$ to receive the arms $e''$ of the brake-heads, said arms being provided with a corresponding dovetail tongue or projection, thus reducing the cost of manufacture, as the pins and bolts are dispensed with. In order to impart this horizontal movement necessary to apply the brake-heads to the wheels, projecting studs $f'$ are inserted in each of the arms $e''$, which studs are embraced by the bifurcated ends of the levers $g$, which levers are pivoted at $g'$ to the brackets $e$ of the truck-frame. These levers $g$ are connected in pairs by the bars I I, which extend from side to side of the truck-frame, parallel to each other and at such a distance apart as to leave room between them for the devices by which they are operated. These devices consist of a rectangular block, J, placed below the bars I I, and connected at each corner to said bars by the diagonally-placed rods $h\ h$, which are pivoted at their lower ends to the block, and at their upper ends hooked over or otherwise suitably connected to the bars. Projecting upwardly from the center of the block J, and secured thereto by a pin passing through it, and provided on its under side with a nut or equivalent means so that it may revolve, is the standard K, which occupies the center of the system or place commonly taken up by the king-bolt. To the upper end of this standard is pivotally attached one end of the lever K', which is fulcrumed upon the pin $i$ in the bracket $h'$, attached to the bottom of the car, the forward end of said lever being beneath the driver's platform, and connected by a rod, $i'$, with one arm of the bell-crank hand-lever L, which is pivoted to and fulcrumed on the standard L', secured to the floor of the driver's platform. From this construction it is evident that a pull upon the hand-lever in the direction of the arrow, Fig. 3, will raise the forward end of the lever K' and depress its rear end, carrying with it the standard K and block J. The downward movement of this block will draw upon the diagonal bars $h$, causing the bars I I to approach each other, thus oscillating the levers $g$, attached thereto, upon the pivots $g'$, and forcing their bifurcated lower ends in the opposite direction, thus imparting through the studs $f'$ an outward sliding movement to the brake-arms $e''$, causing the brake-heads $f$, carried by said arms, to impinge upon the treads of the four wheels of the truck with a force corresponding with the power applied to the hand-lever L, such impingement continuing so long as the power continues to be applied to the hand-lever; or, if desired, a portion of the rod $i'$ may be provided with ratchet-teeth and a pawl pivoted to the floor of the platform made to engage with such ratchet by the foot of the driver, thus allowing the brakes to be set and remain in that condition until released by the disengagement of the pawl.

In order to withdraw the brakes from the wheels and keep them in that condition until they are applied by the hand-lever, one or more U-shaped springs, $m$, are placed between the bars I I, forcing them apart, and consequently, through the connecting devices, removing the brakes from their contact with the treads of the wheels. It will be seen that these devices form a perfect equalizing system for the brakes, causing them to apply an equal pressure to each wheel.

In order to avoid the delay connected with the ordinary method of operating switches on street-railways, I provide the cars with mechanism substantially as follows, by means of which the driver is enabled to open or close a switch without stopping or having his attention taken from his team or the roadway adjoining the track: To accomplish this result, two vertically-moving bars, N, which slide in strong guides N', are placed one on each side of the car-platform, within easy reach of the driver. The lower ends of these bars are so formed that when either bar is thrust down to its lowest limit it will catch upon one of the trips or cams $n$, placed at each side of the track, and which, by means of suitable connections, are made to move the switch point $o$ in the desired direction. The upper end of each bar N is provided with a suitable handle, $p$, and the bars when not in use are supported by the springs $s$, which are preferably of the form shown, but may be of any form that will permit the necessary movement of the bar. To operate this device, on approaching a switch, the driver forces down the bar on that side of the car which will give the described movement, and holds it in that position until it strikes the cam, or the switch is passed, when it is released, and the spring $s$ returns it to its normal position and retains it in that position until again needed for use. If the switch be properly adjusted, the bar will pass without disturbing the same; but if not, it acts upon the cam and places it in the proper position, thus enabling the driver to be always sure of the proper adjustment of the switch in the darkest night.

As these switch-operating devices form the subject of a separate application for patent, I do not herein claim the same.

Having thus described my invention, I claim as new, and desire to secure by Letters Patent, the following:

1. In a revolving street-car, the combination of the body provided with an annular flanged circle-plate, secured to its bottom and inclosing the brake-operating devices, with the annular supporting or truck frame provided with wheels placed tangentially to the radius of said annular frame carrying the flanged circle-plate, and further connected therewith by clamps secured to the truck-frame and embracing the flanged circle-plate, as set forth.

2. In a revolving street-car, the annular truck-frame provided with four radially-placed projections, each of which carries the two depending jaws of a pedestal formed to receive an axle-box, said jaws being integral with said frame, as and for the purpose stated.

3. In a revolving car, the annular truck-frame provided with forward and rear extensions terminating in upwardly-projecting catch-pins, in combination with the horizontally-sliding catch-block, its attached rod, and the bell-crank lever and stop-plate pivoted to the platform-floor, and arranged to operate in the manner and for the purpose specified.

4. The annular truck-frame provided with radially-extending projections having parallel arms, which extend downward and form the jaws of the pedestals, in combination with axle boxes having free vertical play between said jaws, and springs secured to the truck, with their ends resting upon the axle-boxes between the jaws, substantially as and for the purpose specified.

5. An annular truck-frame provided with pairs of vertical arms connected at the bottom by a slotted or dovetailed bar, said parts being made integral with the frame, in combination with the brakes having projecting tongues sliding in said slots or dovetails, the parts being arranged and operating as set forth.

6. In a revolving street-car, the annular truck-frame provided with brake holding and guiding devices, as described, in combination with the brake-operating mechanism consisting of pairs of slotted levers connected by bars, a vertically-moving block, links connecting said bars and block, and means for operating said block, as specified.

7. In a revolving street-car brake, the truck-frame provided with brake supports and guides, the brake-bars I I, the block J, and links connecting said block and bars, in combination with the centrally-placed standard K, the lever K', bell-crank hand-lever L, and rod connecting said hand-lever with the lever K, all arranged as shown and described, to operate the brakes from the driver's platform.

8. In an annular truck-frame, the brake supports and guides, in combination with the brake-bars and springs $m$, arranged to automatically force the brakes out of contact with the wheels, as set forth.

In testimony whereof I hereunto affix my signature in presence of two witnesses.

MARTIN A. CUTTER.

Witnesses:
 H. A. HALL,
 M. V. E. CHANDLER.